June 2, 1931. R. A. WEBSTER 1,808,274
PROJECTION PRINTER
Filed Sept. 8, 1927 3 Sheets-Sheet 3
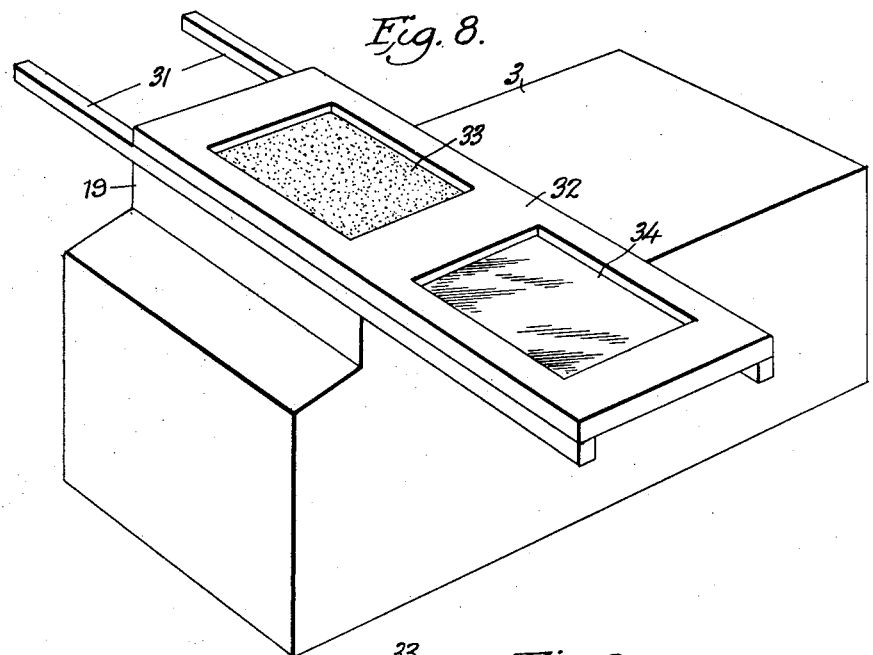
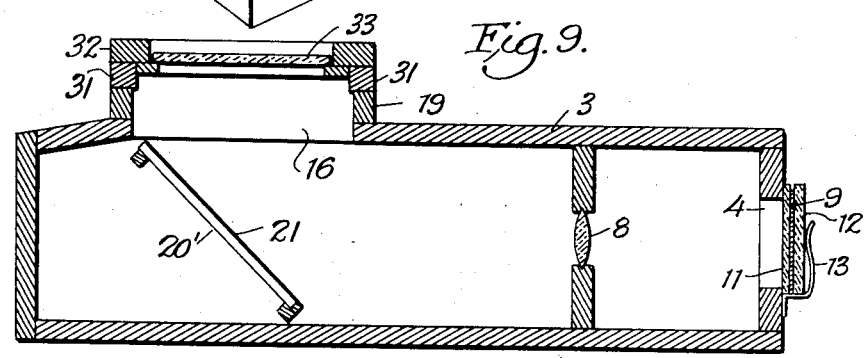
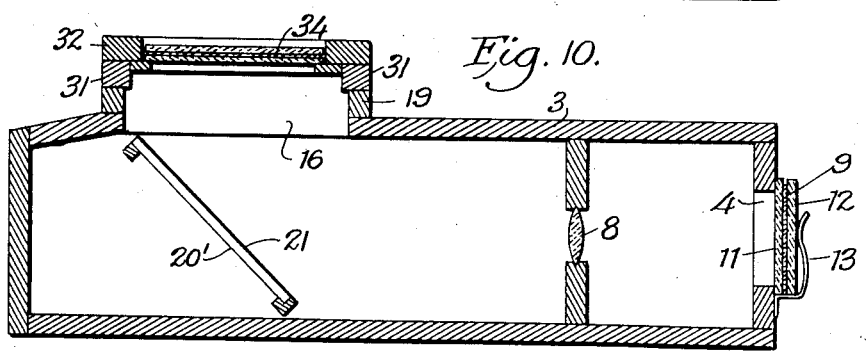
INVENTOR:
Robert A. Webster,
BY
ATTORNEY.

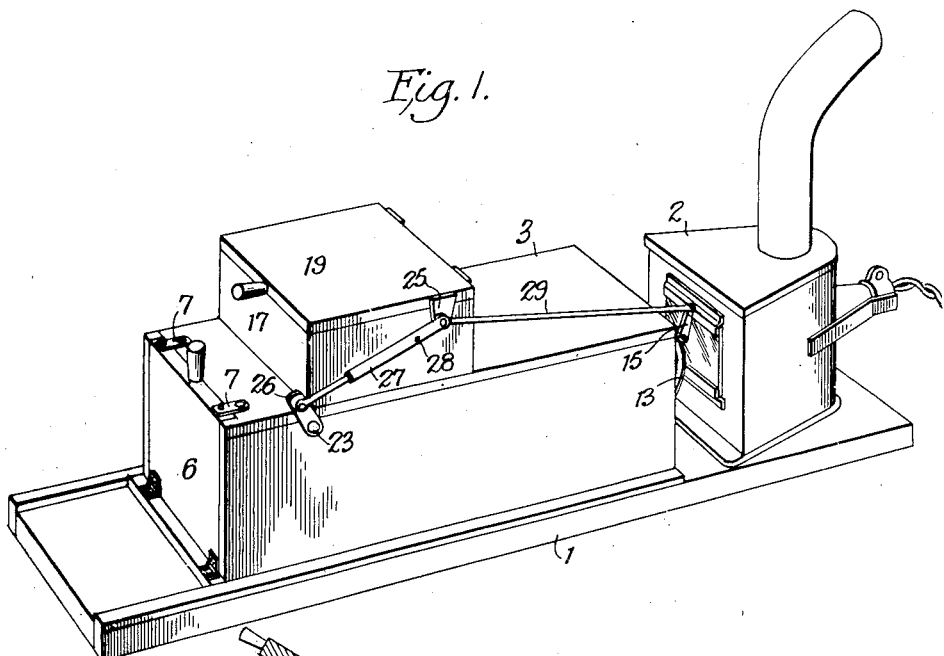
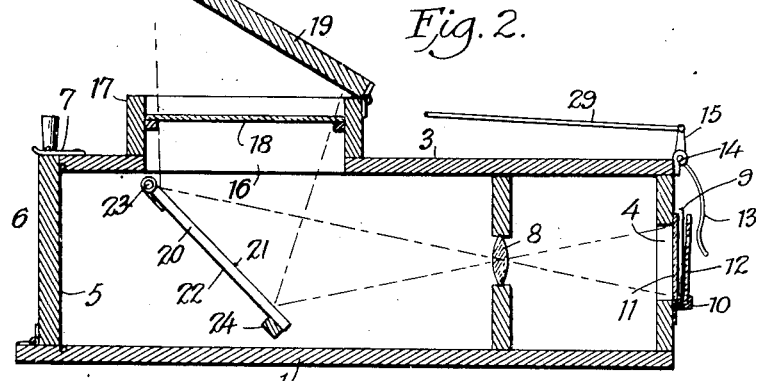
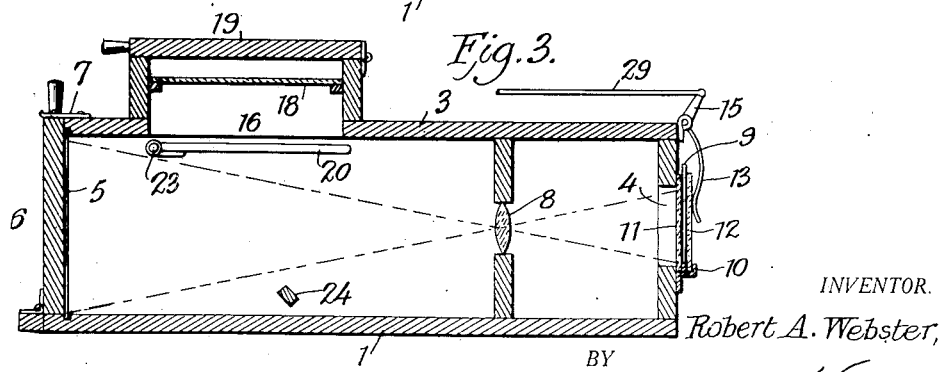

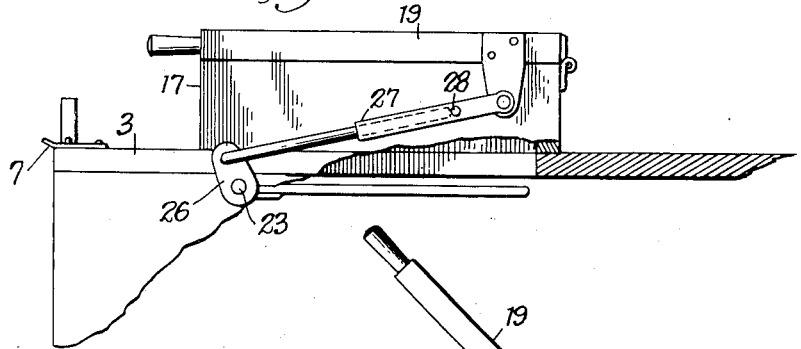
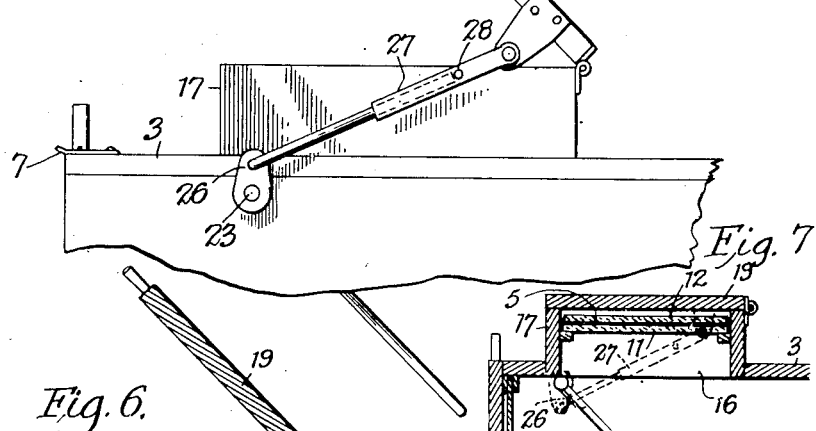
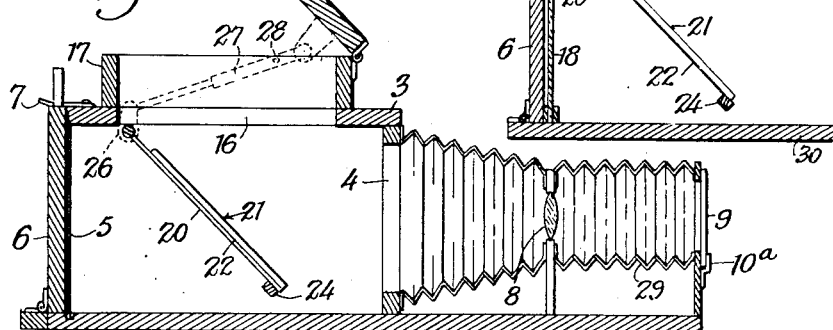

Patented June 2, 1931

1,808,274

UNITED STATES PATENT OFFICE

ROBERT A. WEBSTER, OF SANTA MONICA, CALIFORNIA

PROJECTION PRINTER

Application filed September 8, 1927. Serial No. 218,295.

This invention relates to a projection printer for the projection of an image from a negative or other subject object onto photosensitive paper or the like for producing a print of the image.

The primary object of the invention is to provide means whereby the operator, before or after having placed the photosensitive material in position for use, may view the image as it should appear when printed, in such manner as to determine whether or not the image is in focus, or properly centered, or, if the negative is in strip form, whether or not the desired negative of the strip is in position for use, or to enable the operator to judge the value of a negative or positive for photographic or scenic reproduction, or to judge its density in order that a correct time exposure for printing may be given, and for other similar purposes.

Another object of the invention is to provide means whereby the operator may dispose a reflector and focusing screen in proper position for use to enable the operator to view and judge, or focus, view and judge, the image conveniently and quickly and then close a shutter covering the screen against entrance of light and simultaneously move the reflector out of the path of light projected through the image so that the operation of printing may be immediately carried out.

Still another object of the invention is to provide means for adjusting the screen light shutter and reflector in unison by movement of the shutter and also, if desired, for controlling an image holder in the use of the device in connection with moving picture and similar roll or strip films.

Still another object of the invention is to provide an arrangement whereby the image may be inspected and focussed and the sensitive material printed therefrom by reflected light.

The invention may be applied to devices for inspecting moving picture negatives or positives for judging purposes and for making prints therefrom for test purposes, or to printing cameras of fixed or variable focus types for printing enlarged or reduced prints or prints of the same size as the image. I do not, therefore, limit the invention to any of the purposes named, as its principle may be applied with advantage for any of such purposes and for many other analogous purposes.

In the accompanying drawings showing certain exemplifications of the invention,—

Figure 1 is a perspective view of a projection printer of fixed focus type embodying the invention.

Figure 2 is a vertical longitudinal section of the device, showing the screen shutter and reflector adjusted for observation purposes.

Figure 3 is a view similar to Figure 2 showing the screen shutter closed and the reflector retracted to expose the sensitive material for printing.

Figures 4 and 5 are side elevations showing the coupling means between the screen shutter and reflector in the two positions of adjustment of the shutter and reflector.

Figure 6 is a view similar to Figure 2 showing the embodiment of the invention in a variable focus projection printer.

Figure 7 shows a modified arrangement for printing by reflected instead of direct light.

Figure 8 is a perspective view of another modified form of device.

Figures 9 and 10 are transverse sections similar to 7 through the device shown in Figure 8, illustrating the sliding frame in its two working positions.

In the form of my invention as disclosed, for purposes of exemplification, in Figures 1 to 5, inclusive, 1 designates a suitable base upon which is supported a suitable source of light 2 for furnishing a light beam of desired intensity. Upon this base is also supported the projection printer proper, which comprises a casing 3 of preferably oblong rectangular form, one end of which faces the light source 2 and is provided with a light aperture 4 through which the beam of light from the source is projected into the casing. The end of the casing opposite the light source is open and provided with suitable means for holding sensitized paper or film or other photosensitive material 5 in position to be acted upon by the light rays. The means for holding the photosensitive material in position may be of any suitable character. In the present instance a hinged clamping door or shutter 6 is employed, which is adapted to be secured in closed position by fastening members 7. A lens 8 is suitably arranged in the casing in the path of the beam of light and between the light aperture 4 and the photosensitive material 5, for projecting a luminous image formed by the beam against the sensitive material. This lens may be of any suitable character for enlarging or reducing the image or projecting an image of the same size as the original against the sensitive material. The construction here shown is one of fixed focus type, but in practice any suitable means for adjusting the lens or related factors to certain degrees may be provided to compensate for any deviations from a correct focus which may be present under varying operating conditions.

The end of the casing having the light aperture 4 is provided with a suitable holder for the image bearing negative, positive or other object 9, for disposing the same in line with the light aperture and in the path of the light beam from the source 2. This holder may be one of fixed type or of adjustable or clamping character, as desired. In the present instance a holder retainer 10 is shown supporting the holder which comprises a pair of transparent plates 11 and 12, of glass or other suitable material, which are normally loosely confined in the retainer so as to admit of their relative movements for the purpose of clamping and releasing the image object 9. By this means when the plates 11 and 12 are free from movement or loosely held an image bearing object may be easily and conveniently inserted and removed or adjusted or slid between the plates for centering purposes or, in case of a strip object bearing a consecutive series of pictures, such as a picture strip or film, to allow movement of the strip to bring any certain image in position for observation and printing purposes. The plates 11 and 12 are adapted to be clamped and released by means of a spring clamping member or finger 13 mounted upon a crank shaft 14 carrying a crank arm 15 whereby the clamping member may be moved into and out of clamping position, as hereinafter described.

Formed in the top of the casing 3 at a point between the lens 8 and the sensitive material holder 6 is an observation opening 16 in register with a light hood 17 in which is arranged an observation or focusing screen 18 of ground glass or other suitable material. A hinged shutter 19 is provided for opening and closing the hood and is suitably constructed to close the hood in a light-tight manner. Disposed within the casing for coaction with the screen 18 is a reflector 20 having a reflecting surface 21 and a non-reflecting surface 22. This reflector is disposed beneath the light aperture 16 and at such a point between the lens 8 and the photosensitive material 5 as to give a correct reflection of the properly focused image when said reflector is in a predetermined reflecting position. The reflector is pivotally mounted at its upper edge to swing in a vertical plane on a transverse rock shaft 23 so as to be movable into and out of the path of the luminous image beam between the lens and the photosensitive material. When the reflector is swung down to the angular or inclined position shown in Figure 2, in which it abuts against stops 24, it lies in the path of the light beam and in position to reflect the properly focused image so that it may be observed through the screen 18. From this position the reflector is movable up to the horizontal position beneath the opening 16 and out of the path of the light rays, so that the rays may be projected without interruption against the sensitive material 5 for a printing action. It will thus be understood that after the image object is placed in the holder 11—12, the operator on opening the shutter 19 and moving the reflector 20 to the position shown in Figure 2 may view the image upon the surface 21 of the reflector through the screen 18 and thus determine whether the image is in correct focus or properly centered, and then upon closing the shutter 19 and moving the reflector 20 to the retracted position shown in Figure 3 may immediately expose the applied sensitive material 5 to the action of the luminous light beam for printing purposes. Observation of the image in the manner described also enables the operator to judge of the value of the image for printing projection or density of the image in order that the correct time of exposure may be given. With the parts in the position shown in Figure 2 in which the image is loosely held by the holder 11—12, the operator may also in the case of strip pictures, for example, a moving picture film, slidably adjust the film in the holder so that the successive pictures may be viewed for judgment purposes, or so that any one or more pictures of the strip may be accurately brought into position for printing selected pictures only of the strip, as will be readily understood.

For convenience and celerity of operation, I provide means whereby upon the opening and closing of the shutter 19 the reflector 20 and image holder clamp 13 may be moved simultaneously therewith. As shown, the shutter 19 is provided with a crank member 25 which is coupled to a crank arm 26 on the reflector shaft 23 by a linearly adjustable or telescopic connecting rod 27 composed of slidably related sleeve and rod sections respectively connected with said crank members and which are adapted by their sliding connection to transmit motion from the shutter 19 to the reflector 20 while compensating for the differences in their arcs of motion. The sleeve member of the rod 27 may desirably be provided with a stop pin 28 to engage the rod member on a partial closing of the shutter and then transfer downward movement to the reflector during the remainder of the closing movement of the shutter. When the reflector 20 rests on the stops 24, this stop pin will thus hold the reflector 20 solidly in contact with the stops 21 against any tendency to upward movement under floor or other vibrations. The crank 25 is also coupled to the crank arm 15 of the image holder clamp 11—12 by a connecting rod 29 so that the clamping member 13 will be properly moved in unison with the shutter 19 and reflector 20 to release or clamp the image holder.

In the operation of the device above described, the image carrier 9 is fitted in the holder 11—12, the light from the source 2 turned on, and the shutter 19 swung open to dispose the reflector 20 in reflecting position, whereupon the operator may view the reflected image on the surface 21 through the screen 18 for test purposes and may, if the image is to be printed, make any adjustments of the image in the holder that may be necessary to properly dispose or center it. Upon then closing the shutter 19 the reflector 20 will be retracted and the clamp 13 operated to firmly clamp the image bearing object 9, after which the sensitive material 5 may be applied and the door or shutter 6 closed to clamp the same in position and the printing operation then immediately carried out. If desired, the reflector 20 may serve as a light shutter, so that it will exclude light when it is in reflecting position from the sensitive material 5 previously fitted in position for exposure, or, if desired, the shutter or door 6 may be provided with a slide to cut off light from the sensitive material 5 during the focusing action, so that immediately upon the closure of the door 19 and retraction of the reflector 20 and upon the withdrawal of the slide the printing action may be carried out, whereby a time saving type of apparatus may be produced.

In Figure 6 I have shown a modified form of my invention in which the lens 8 and holder 10ª for the image bearing object 9 are removed from the casing body and mounted respectively within and upon a bellows attachment 29 adjustable upon a base 30 extended from the bottom of the casing, whereby a variable focus type of projection printer is provided. With this addition to the device employing the screen and reflector great focusing accuracy may be obtained and such a type of construction will be found of advantage under many conditions of use.

In Figure 7 I have shown another modification in which the positions of the screen and light sensitive material are relatively reversed so as to admit of printing being done by reflected instead of direct light. As shown, the holder 11—12 for the sensitive material is here arranged to be supported in the hood 17 in line with the light aperture 16, and the screen 18 is fitted in that end of the casing provided by the door 6. The arrangement is thus such that when the reflector 20 is at its upper or retracted position and the door 6 open an observation or focusing action may be carried out, while, on the other hand, when the reflector is in its lower or operative position and the light sensitive material 9 is in place in the hood 17 the image beam will be reflected against the said sensitive material for a printing action. With this construction the same type of coupling connection between the shutter 19 and the reflector 20 may be used except that crank 26 is reversed or set at an angle of 180° to that shown in Figures 1 to 5, inclusive, in order that a reverse working action of the parts 19—20 may here be obtained, i. e., retraction of the reflector 20 when the shutter 19 is opened and projection of the reflector to working position when said shutter is closed. Otherwise the construction of the parts may be the same as disclosed in Figures 1 to 5, inclusive, or in Figure 7.

Instead of employing a movable mirror I may, as shown in Figures 9 and 10, employ a fixed mirror 20', in which event the shutter 19 will be dispensed with and the hood 17 provided with guides 31 for a sliding frame 32 carrying a focussing screen 33 and a sensitive material holder 34, either one of which may, by sliding the frame 32 in one direction or the other, be brought into registry with opening 16. With this construction, the image may first be inspected or focussed and the sensitive material then brought into printing position and the printing carried out by reflected light. Of course, suitable provision may be here made, if desired, for adjusting the image carrying element or the reflector, or both, for very fine focussing actions. A door corresponding to door 6 may or may not be used in this type of device.

From the foregoing description, taken in connection with the drawings, the construction and mode of operation of the device will be readily understood without a further and extended description and the value of the device for the several purposes stated and analogous purposes appreciated by those versed in the art. While certain forms of the invention are herein shown for the purpose of exemplification, it is, of course, to be understood that various changes in construction, proportion and arrangement of parts may be made, within the scope of the appended claims, without departing from the spirit or sacrificing any of the advantages of the invention.

Having thus fully described my invention, I claim:—

1. A projection printer comprising a casing having a light aperture, means for holding an image in line with said aperture for the projection of light therethrough and into the casing, means for holding a light sensitive material in the path of the light passing through the image, a lens in the casing in the path of the light and between the image and sensitive material, a focusing screen, a shutter for covering and uncovering the screen, a reflector movable into and out of the light path at a point between the lens and sensitive material and upon which the image may be viewed through the screen when the reflector is in the first-named position, and means for simultaneously operating the shutter and reflector.

2. In a projection printer, means for holding a light sensitive material, means for holding an image to be printed, means for projecting a luminous beam of the image, a focusing screen, a shutter for covering and uncovering the screen, a reflector movable into and out of the path of the beam, and means whereby the shutter and reflector are cooperatively movable.

3. A projection printer comprising a casing having a focusing screen, means for admitting a light beam and projecting it against sensitive material, a reflector movable into and out of the projected path of the light beam, a shutter for uncovering and covering the screen, and means operative on the opening and closing movements of the shutter for moving the reflector respectively into and out of reflecting position.

4. In a projection printer, a casing having an opening for the projection thereinto of a luminous image beam, means for holding sensitized material to be printed in line with said opening, a focusing screen, a reflector movable toward and from said screen and simultaneously out of and into the path of the beam, and means for conjointly moving the shutter and reflector.

5. In a projection printer, means for projecting a luminous image beam, means for holding sensitized material, a focusing screen, a shutter for covering and uncovering the screen, a reflector movable into and out of the path of the beam, and a coupling connection between the shutter and reflector adapting them to be moved in unison.

6. In a projection printer, a casing having a pair of light apertures, means for holding a negative in line with one of said apertures, a lens arranged in the path of a beam of light projected through the negative and against the sensitized material, a focusing screen arranged in line with the other light aperture, a shutter for covering and uncovering the screen, a reflector movable toward and from said screen and into and out of the path of the light beam, and means for simultaneously operating the shutter and reflector.

7. In a projection printer, a casing, a lens therein, means for holding a negative for the passage of a light beam therethrough and through the lens, means for holding sensitized material, a focusing screen, a shutter for covering and uncovering the screen, a reflector movable toward and from the screen and into and out of the path of the light beam, and a coupling connection between the shutter and reflector adapting them to be moved in unison.

8. In a projection printer, a casing, a lens arranged therein, means for holding a negative for the passage of a light beam through the same and the lens, means for holding sensitized material, a focusing screen, a shutter for covering and uncovering the screen, a reflector movable into and out of the path of the light beam, and a variable telescopic crank and rod connection between the shutter and reflector adapting them to be moved in unison.

9. In a projection printer, a casing having means for holding sensitized material, means for projecting a luminous image beam against said material, a shutter for opening and closing an aperture in the casing, a focusing screen in said aperture and adapted to be covered and uncovered by said shutter, a reflector movable into and out of the path of the light beam, and means connecting the reflector and the shutter for movement in unison.

10. In a projection printer, a casing having an opening therein for admitting a light beam, a negative holder arranged in line with said opening and composed of members relatively adjustable to loosely hold or to clamp the negative, means in the casing for holding sensitized material, a lens in the casing in the path of the beam between the negative holder and means for holding sensitized material, a focusing screen, a reflector, a shutter for covering and uncovering the screen disposed between the lens and the means for holding the sensitized material and movable out of and into the path of the light beam, and means operated by the shutter in the screen uncovering and covering movements thereof for adjusting the reflector into and out of the path of the light beam and simultaneously relatively adjusting the members of the negative holder to loosely hold or to clamp the negative respectively.

11. A projection printer comprising a casing having an opening for the passage thereinto of a light beam, a focusing screen, a shutter movable to closed and open positions for covering and uncovering said screen, means for holding sensitized material, a reflector coupled to the shutter for movement therewith and movable toward and from the screen and into and out of the path of the light beam between the light opening and the means for holding sensitized material, and a holder in line with the light opening for clamping and releasing a consecutive negative strip, said holder being operated automatically for a clamping action when the reflector is moved out of the path of the light beam and for a releasing action when the reflector is moved into the path of the light beam.

12. A projection printer comprising a casing having an opening for the passage thereinto of a light beam, a focusing screen, a shutter movable to closed and open positions for covering and uncovering said screen, means for holding sensitized material, a reflector coupled to the shutter for movement therewith and movable toward and from the screen and into and out of the path of the light beam between the light opening and the means for holding sensitized material, a negative holder arranged in line with the light opening and comprising members relatively movable for negative clamping and releasing actions, and means for operating said holder automatically for a clamping action when the reflector is moved out of the path of the light beam and for a releasing action when the reflector is moved into the path of the light beam.

13. A projection printer comprising a casing having an opening for the passage thereinto of a light beam, a focusing screen, a shutter movable to closed and open positions for covering and uncovering said screen, means for holding sensitized material, a reflector coupled to the shutter for movement therewith and movable toward and from the screen and into and out of the path of the light beam between the light opening and the means for holding sensitized material, a negative holder arranged in line with the light aperture and comprising members relatively movable for a negative clamping or releasing action, a resilient clamping and releasing member movable to shift the holder members to clamping or releasing position, and an operating connection between said member and the shutter.

In testimony whereof I affix my signature.

ROBERT A. WEBSTER.